(12) United States Patent
Jarmon et al.

(10) Patent No.: US 6,627,019 B2
(45) Date of Patent: Sep. 30, 2003

(54) PROCESS FOR MAKING CERAMIC MATRIX COMPOSITE PARTS WITH COOLING CHANNELS

(76) Inventors: David C. Jarmon, 44 Blue Ridge Rd., Kensington, CT (US) 06037; Xiaolan Hu, 580 Miller Rd., South Windsor, CT (US) 06074; Steven Wayne Burd, 36 Rence Ct., Cheshire, CT (US) 06410; Christopher Dale Jones, 48 Brandywine La., Suffield, CT (US) 06078; Stephen K. Kramer, 57 R Washington Rd., Cromwell, CT (US) 06416; Christopher L. Kogstrom, 536 Anchorage Dr., North Palm Beach, FL (US) 33408; Nikolaos Napoli, 9500 S. Ocean Dr., Unit 504, Jensen Beach, FL (US) 34957; Bruce Bond, 174 Estes Rd., Rochester, NH (US) 03867

( * ) Notice: Subject to any disclaimer, the term of this patent is extended or adjusted under 35 U.S.C. 154(b) by 81 days.

(21) Appl. No.: 09/739,722

(22) Filed: Dec. 18, 2000

(65) Prior Publication Data

US 2002/0076541 A1 Jun. 20, 2002

(51) Int. Cl.⁷ ........................ B32B 31/00; C04B 35/622
(52) U.S. Cl. ................... 156/89.11; 156/89.26; 156/155; 264/610; 264/640; 264/642
(58) Field of Search .............. 156/89.11, 89.23, 156/89.25, 89.26, 89.27, 155; 264/610, 640, 642

(56) References Cited

U.S. PATENT DOCUMENTS 3,533,753 A * 10/1970 Berger
4,613,473 A * 9/1986 Layden et al.
5,076,330 A * 12/1991 Kimbara et al.
5,227,238 A * 7/1993 Hirai et al.
5,350,545 A * 9/1994 Streckert et al.
5,360,490 A * 11/1994 Nelson
5,391,338 A * 2/1995 Bandel et al.
5,403,153 A * 4/1995 Goetze
5,456,981 A * 10/1995 Olry et al.
5,864,743 A * 1/1999 Tuchinskiy et al.
5,916,510 A * 6/1999 Jessen ........................ 264/610
5,939,216 A * 8/1999 Kameda et al.
5,961,661 A * 10/1999 Jessen ........................ 264/610
6,217,997 B1 * 4/2001 Suyama et al.
6,274,078 B1 * 8/2001 Dunyak et al.
6,418,973 B1 * 7/2002 Cox et al.
2002/0164250 A1 * 11/2002 Chung et al.
2003/0021974 A1 * 1/2003 Beyer et al.

OTHER PUBLICATIONS

"Composite Materials Schience and Engineering" by Chawla Krishan K., Published by Springer–Verlag, New York (198 (Copies of the following pages are enclosed: Part II, Sect. 5.1, "Polymer Matrix Composites—Fabrication of PMC's", pp 89–91; and, Part II, Sect. 7, "Ceramic Matrix Composites", pp. 134 through 149), 1987.

* cited by examiner

Primary Examiner—Melvin C. Mayes

(57) ABSTRACT

A ceramic matrix composite part having elongated cooling channels within the wall thereof is manufactured by inserting decomposable inserts within a woven ceramic fiber preform. The inserts are tows of continuous carbon fibers surrounded by a carbonaceous filler, and are inserted where the channels are desired. The preform, with the inserts in place, is disposed within a mold. A ceramic matrix material is added and the fiber preform is consolidated with the ceramic matrix material. The consolidated part is then heated to thermally decompose the inserts to create the elongated channels within the part. The inserts may be flexible and woven into the preform using an automated weaving loom, or they may have limited flexibility and be inserted by machine or by hand.

27 Claims, 9 Drawing Sheets

300 μm

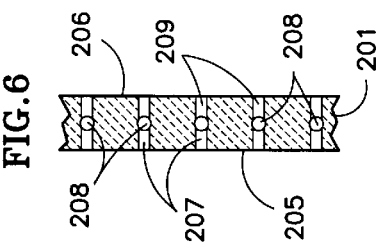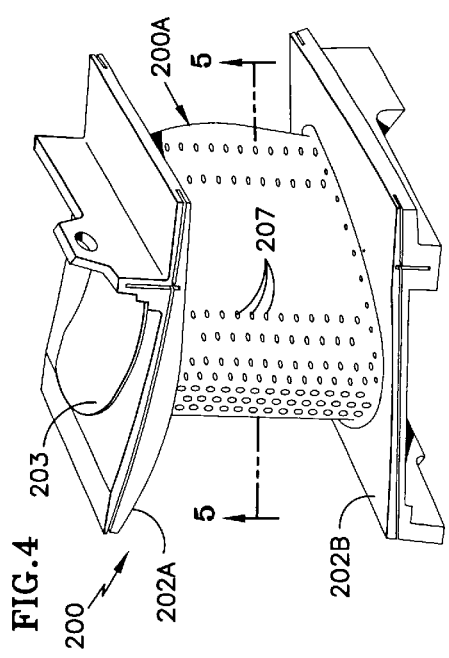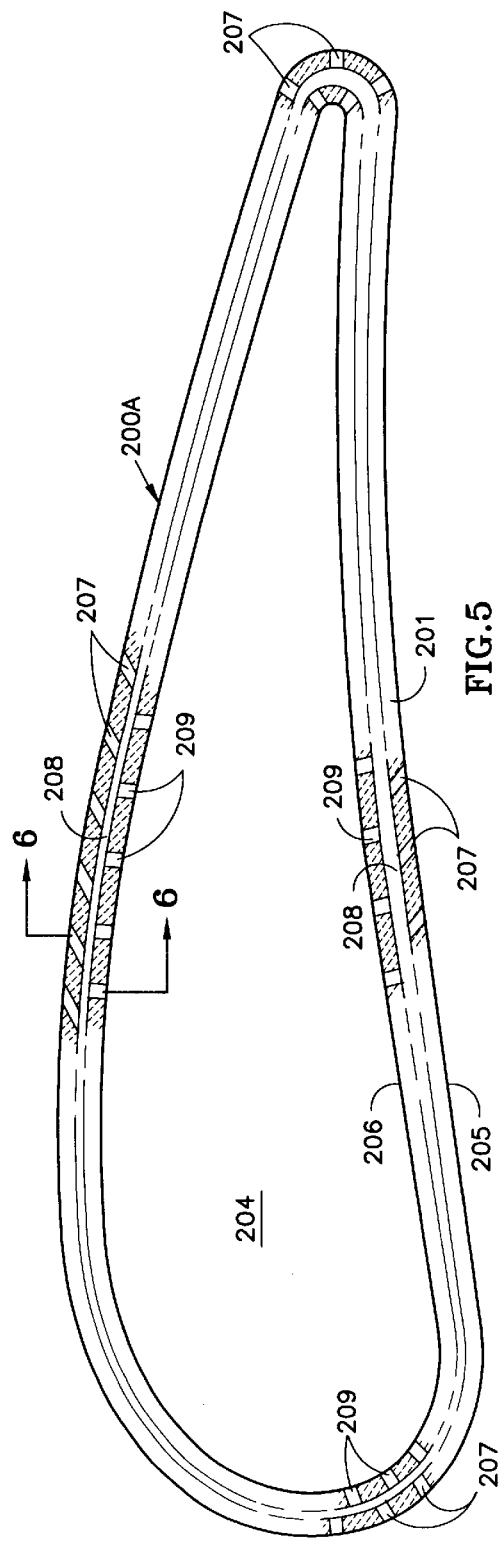

PROCESS FOR MAKING CERAMIC MATRIX COMPOSITE PARTS WITH COOLING CHANNELS

This invention was made with Government support under contract number F33615-96-C-2561, awarded by the Department of the Air Force. The Government has certain rights in this invention.

BACKGROUND OF THE INVENTION

1. Technical Field

This invention relates to the manufacture of ceramic matrix composite parts having cooling channels therein.

2. Background Information

Ceramic matrix composites("CMC") are well known in the art and may comprise ceramic fibers in a ceramic matrix. CMC are used in high temperature environments, such as in the hot section of a gas turbine engine. For handleability, and to achieve desired mechanical and thermal property orientation in the final product, the ceramic fibers may be woven together to form essentially two-dimensional plies of fiber "cloth", or they may be woven into a three dimensional preform of the desired thickness. The preform and matrix are then consolidated in a mold by any of several well know processes, such as by melt infiltration, chemical vapor infiltration, or pre-ceramic polymer processing.

One known CMC composition is made using silicon carbide fibers in a silicon carbide matrix (commonly referred to as a SiC/SiC composite). Another well know CMC composition uses SiC fibers in a silicon-nitrogen-carbon matrix (commonly referred to as a SiC/SiNC composite). Although, using current technology, these and other ceramic matrix composites can withstand temperatures as high as 2200° F., they still need to be cooled for today's gas turbine applications, and improvements are being sought to even further increase their temperature capabilities. Usually the walls of gas turbine engine components are made as thin as possible to minimize weight and to decrease the "through thickness" thermal stresses. The wall thickness of hollow CMC turbine vanes is usually no more than about 0.1 inch, and may be considerably less.

A common method for preventing the degradation of components subject to very high temperatures is to flow cooling fluid through channels or passageways within the component. Current CMC fabrication techniques and materials make it difficult to form curved channels and in-plane internal channels having the requisite shapes, locations, tolerances, and dimensions, especially in-plane small diameter channels for thin walled components.

It is well known that straight passages or channels extending from an outer surface of the part to the interior or entirely through the part can be formed by laser machining after consolidating the fiber preform and matrix material; however, laser drilling has its limitations since curved channels cannot be laser drilled, and channels oriented substantially parallel to a wall surface (i.e. in-plane) cannot be made by laser drilling in thin walled parts, unless drilled into an edge. In any event, laser drilling is practical only for straight passages of less than about 0.5 inch long.

Voids or channels of various shapes may also be created within CMC parts by the steps of (a) inserting either carbon rods or graphite paper between the fiber plies as they are being laid-up in the mold, and (b) burning-out (thermal decomposition by oxidation) the carbon after consolidation of the preform and matrix material. The use of carbon rods is not practical for long, narrow or curved channels since they are brittle and mechanically weak (i.e., a 0.02 inch diameter carbon rod has a tensile strength of less then 1.0 ksi), breaking easily during the matrix consolidation step. Graphite paper also has a low mechanical strength and tendency to break during handling and weaving (i.e., a tensile strength of less than about 1.0 ksi). Further, neither the use of carbon rods nor graphite paper is suited to an automated manufacturing process, especially where the channels are long, have small diameters, must be carefully located, may need to interconnect with each other, or may need to have a small radius of curvature. More specifically, in view of manufacturing limitations, it has not been possible to make ceramic matrix composite parts with small diameter (i.e. less than and effective diameter of about 0.10 inch) elongated channels that include a change in direction requiring a radius of curvature smaller than about 6.0 inches. Thus, zig-zag channels could not be formed. Also, it was not possible to form a complex pattern of intersecting elongated channels, such as an intersecting grid of channels within a thin wall. As used herein and in the appended claims, "elongated" means having a length to "effective diameter" ratio of at least about 50. Effective diameter is the diameter of a circle having the same cross sectional area as the channel in question.

BRIEF SUMMARY OF THE INVENTION

In the manufacture of a ceramic matrix composite part, inserts having essentially the size and shape of elongated channels to be formed within the part are disposed at a desired location within a woven ceramic fiber preform. The inserts comprise a plurality of carbon fibers surrounded by a carbonaceous filler. After the inserts are in place, a ceramic matrix material is added and the fiber preform is consolidated with the matrix material. The consolidated part is then heated to thermally decompose the inserts leaving elongated channels within the part. The inserts may be rods of carbon fibers or may be flexible, weaveable carbon fiber tows.

During the consolidation step, the carbonaceous filler material fills the interstices between the carbon fibers of the inserts and acts as a protective shell around individual carbon fibers and around any bundles of those fibers that comprise the insert. This inhibits process gases and matrix material from entering voids between the carbon fibers and from directly contacting the carbon fibers. The matrix material, if able to contact the fibers, would inhibit the oxidation of the carbonaceous inserts by depositing a non-oxidizable coating on the fibers, making successful removal of the carbon fiber difficult, if not impossible. Any matrix material that works its way between the carbon fibers will not be removed during thermal decomposition. Thus, by way of example, in the chemical vapor infiltration (CVI) consolidation of a SiC/SiC composite, the carbonaceous filler inhibits the methyltrichlorosilane gas from contacting the carbon fibers and depositing silicon carbide thereon.

As used herein and in the claims, a "carbonaceous" filler material is a material that produces at least about 10% carbon residue, by weight, upon thermal decomposition in a non-oxidizing environment. Preferably the filler will form a high surface area material upon decomposition, such as a film or closed cell foam that will inhibit infiltration of the matrix material between the carbon fibers. Without intending to limit the same, examples of carbonaceous filler materials usable in the process of the present invention are colloidal graphite (with or without a binder) and polymers containing sufficient carbon molecules to satisfy the definition of "carbonaceous", such as epoxy, silicone, and polyacrylonitrile.

The process of the present invention is particularly suited for (although not limited to) forming in-plane elongated channels of small effective diameter (i.e. small cross sectional area) between the surfaces of thin walled components, and for closely locating and closely spacing those channels. "Small effective diameter" means a cross section having an effective diameter of less than about 0.10 inch. Parts made by the process of the invention are particularly unique in that they may be made with elongated channels of small effective diameter, wherein the channels may have a radius of curvature of less than 1.0 inch, and even less than 0.02 inch. The weavable braided fibers used in the process of the present invention to form the channels have actually been wrapped around a pin of 0.015 inch diameter without major damage and without significant flattening (which would result in a smaller cross sectional channel area around sharp curves). This makes the process of the present invention particularly suited for making thin walled parts having a plurality of curved, elongated channels of small effective diameter. By a "thin wall" it is meant a wall having a thickness of 0.25 inch or less.

In accordance with one embodiment of the invention, the inserts used in the fabrication process are individual rods of carbon fibers filled with a thermoset polymeric material that is cured in order that the rods hold a rigid cross-sectional shape and can be handled without breaking. The fibers are preferably continuous, substantially unidirectional carbon fiber tows since continuous unidirectional fibers can be packed more densely into the same rod volume. Rods of this type may be made by pultrusion ("pultruded" rods) and are currently commercially available, although used for applications such as to reinforce fishing poles. Pultruded graphite/epoxy rods (comprising continuous graphite filaments) are commercially available in a variety of diameters from 0.010 inch to 0.04 inch, and higher. They may be made with a variety of cross-sectional shapes, so channels of different cross sectional shapes may be formed. The rods may be inserted by hand into or between plies of woven ceramic fibers; or they may be inserted in the fill direction into either a two or three-dimensional preform during the weaving process. In the latter case, the rods are preferably used where minimal bending is required, such as the fill fibers in an angle interlock weave. That is because rods incorporating a cured thermoset filler have limited flexibility and may not be pliable enough to bend around sharp curvatures without breaking.

In a preferred embodiment, the inserts are flexible, weavable inserts. The weavable inserts are comprised of carbon tows filled with a flexible carbonaceous material rather than a cured thermoset polymeric material. Preferably the tows are braided or twisted to help the insert retain a generally circular or oval cross-sectional shape during the weaving operation. In any case, the filled tows are flexible (as compared to the above described rods made with the cured thermoset polymeric material) and can be woven into a preform by standard weaving machines as either or both warp and weft (fill) filaments.

After consolidating the preform with the matrix material, the carbon tows and carbonaceous filler are removed by thermal decomposition, leaving channels in their place within the CMC part. One particular advantage of being able to essentially "weave" a channel in any direction, is that a complex pattern of interconnected channels may be formed; and the channels may be curved and thus may change directions sharply, if desired.

One example of a flexible carbonaceous filler is carbon particles within a carrier, such as a colloid of graphite. Although not required, a binder, such as colloidal silica, is beneficial as it helps keep the carbon particles in place after the fluid carrier has evaporated during processing. Another example of a flexible carbonaceous filler is a thermoplastic polymeric material. RTV silicone is one example of such a material.

In yet another example, the filler may be a partially cured thermoset polymer, which is preferably an epoxy. The filled carbon tows and the ceramic fibers are woven together to form the preform while the thermoset polymer is in a partially cured state prior to full molecular cross-linking. The preform and matrix are then consolidated, during which time the epoxy cures. The channels are then formed by thermally decomposing the filled carbon tows. While the epoxy is in the partially cured state, the carbon tows remain sufficiently flexible to be "weaveable" using automated equipment. Further, the use of epoxy avoids residue build-up on the weaving equipment, as may occur when colloidal graphite is the filler. Yet another advantage is that an epoxy does not produce non-oxidizable constituents.

The foregoing features and advantages of the present invention will become more apparent in light of the following detailed description of exemplary embodiments thereof as illustrated in the accompanying drawings.

BRIEF DESCRIPTION OF THE DRAWINGS

FIG. 4 is a perspective view illustrative of a gas turbine engine stator vane made in accordance with the teachings of the present invention.

FIG. 5 is a sectional view taken along the line 5—5 of FIG. 4.

FIG. 6 is an sectional view, taken generally along the line 6—6 of FIG. 5.

DETAILED DESCRIPTION OF THE INVENTION

EXAMPLE 1

Figure 1:
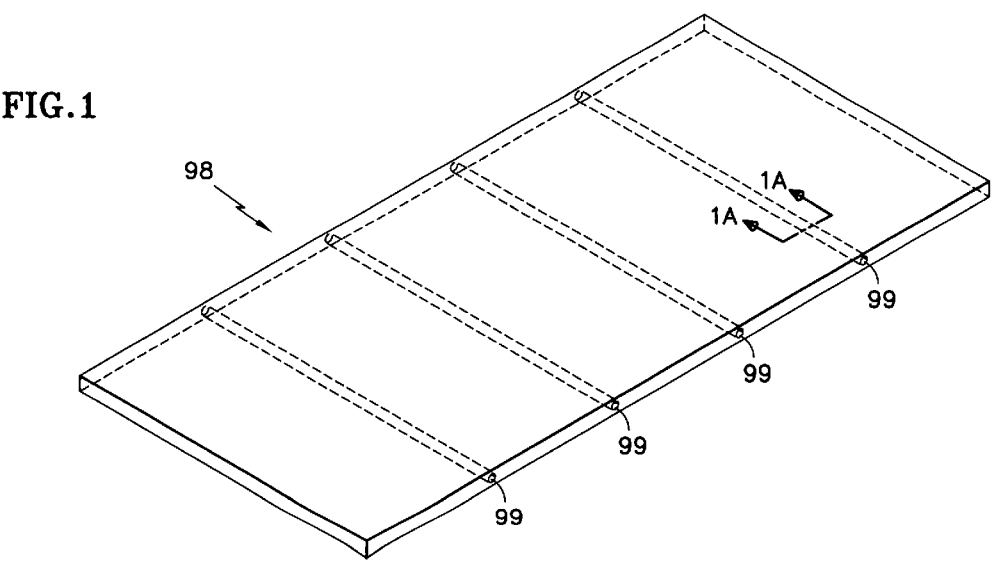
FIG. 1 is a perspective view, not to scale, representative of a SiC/SiC ceramic composite matrix panel with channels formed therein made in accordance with the teachings of the present invention.

In one test, a flat panel SiC/SiC ceramic matrix composite, having a thickness of approximately 0.070 inch, was made as follows:

An angle interlock preform was machine woven using SiC tows of Hi-Nicalon Type S fiber, which is a stoichiometric SiC fiber from Nippon Carbon Company. Each fiber tow comprised 500 filaments, and each filament had a diameter of about 13 microns. In this example, the tows were oval in cross section, having a major axis dimension of about 0.031 inch and a minor axis dimension of about 0.007 inch. In other experiments, SiC tows with diameters ranging from between 0.010 and 0.025 inch were used successfully. The cross-sectional shape and the size of the SiC tows are not critical to the present invention.

The woven preform in this example had five layers of SiC fill (weft) fibers spaced at 128 fibers per inch and five layers of SiC warp fibers spaced at 143 fibers per inch. The total fiber volume was 28 volume percent with 15 volume percent in the warp direction and 13 volume percent in the fill direction. The angle of the warp fibers was 15°.

At four locations in a 6"×9"×0.070" panel of the woven preform, straight graphite/epoxy pultruded rods, having an elliptical cross-section, were inserted at the fill sites in place of the SiC Type S fiber. The ellipse major axis of each rod was about 0.040 inch, and the minor axis was about 0.020 inch. The insertion of the rod was done by stopping the loom; removing a SiC fill tow and in its place inserting a graphite/epoxy rod by hand. The rod was approximately 65 volume percent Pyrofil TR50 continuous carbon (graphite) filaments from Grafil Inc. and 35 volume percent epoxy. The epoxy resin was bisphenol F, and the curing agent was inidazole. Although elliptical rods were used in this example, rods of other cross-sectional shapes may be used in order to make channels having specific cross-sectional shapes.

The woven preform was consolidated with a matrix material by standard melt infiltration silicon carbide/silicon carbide (MI SiC/SiC) processing, as follows: The fiber preform was placed between graphite tooling. The tooled preform was heated in a furnace and a boron nitride fiber/matrix interface layer was applied to the fiber by chemical vapor infiltration. The graphite tooling was removed. The preform was placed in another furnace to deposit the silicon carbide matrix throughout the heated preform via decomposition of methyltrichlorosilane gas—a process called chemical vapor infiltration (CVI). The methyltrichlorosilane gas does not, however, penetrate the graphite/epoxy rods. Further densification of the matrix region was accomplished by slurry casting an aqueous solution of SiC particles. The final densification of the composite was completed by applying silicon to the surface of the panel and heating in a furnace—a process called melt infiltration of silicon.

The last step is the creation of the internal cooling channels by the oxidative removal of the remains of the graphite/epoxy rod material. To that end, the composite panel was placed in a furnace under an air atmosphere at 650° C. and held for 48 hours.

Figure 1A:
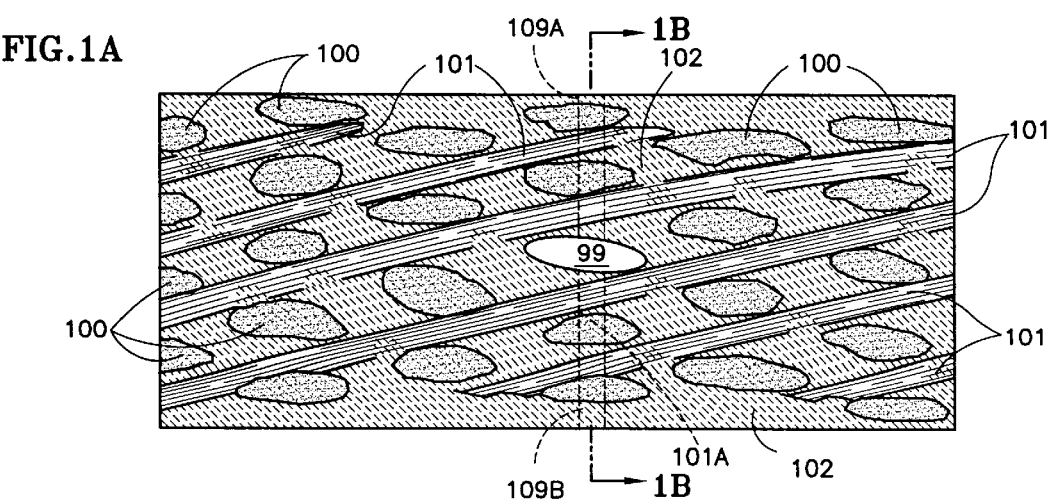
FIG. 1A is a schematic, greatly enlarged sectional view (based upon a photomicrograph) taken generally along the line A—A of FIG. 1.
Figure 1B:
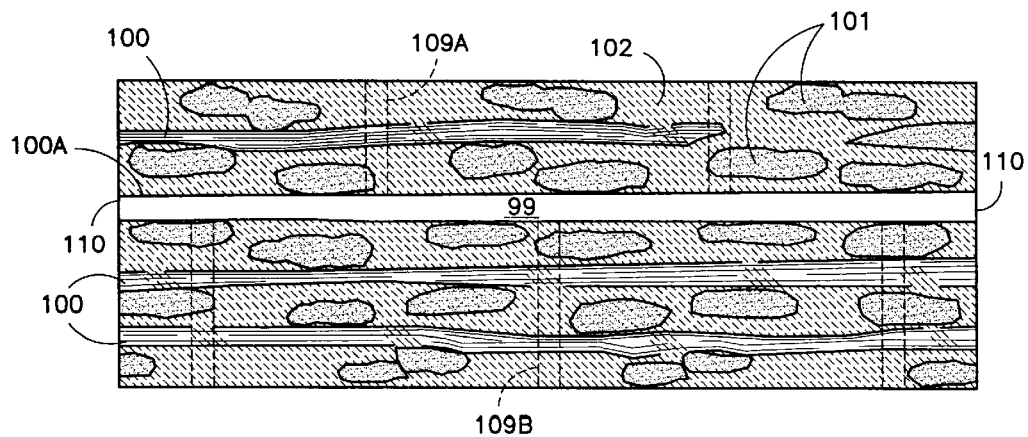
FIG. 1B is a schematic, sectional view (based upon a photomicrograph) taken along the line B—B of FIG. 1A.

FIG. 1 is illustrative of a 0.070 inch thick panel 98 made in the manner of the foregoing example. The four cooling channels created within the panel by the thermal decomposition of the four graphite/epoxy rods inserted into the preform are designated by the reference numeral 99. The cross-section of FIG. 1A, taken along the line A—A of FIG. 1, is substantially parallel to the direction of the SiC warp fibers. And the cross-section of FIG. 1B is a section taken substantially parallel to the direction of the SiC fill fibers and the graphite/epoxy rods.

The SiC tows of fill fibers are designated by the reference numeral 100; and the SiC tows of warp fibers are designated by the reference numeral 101. The matrix material 102, which is a mixture of SiC slurry particulate and melt infiltrated silicon, is disposed between the fibers and has also infiltrated the SiC fibers, as represented in the drawing by gray shading and stippling within the SiC tows.

Figure 1C:
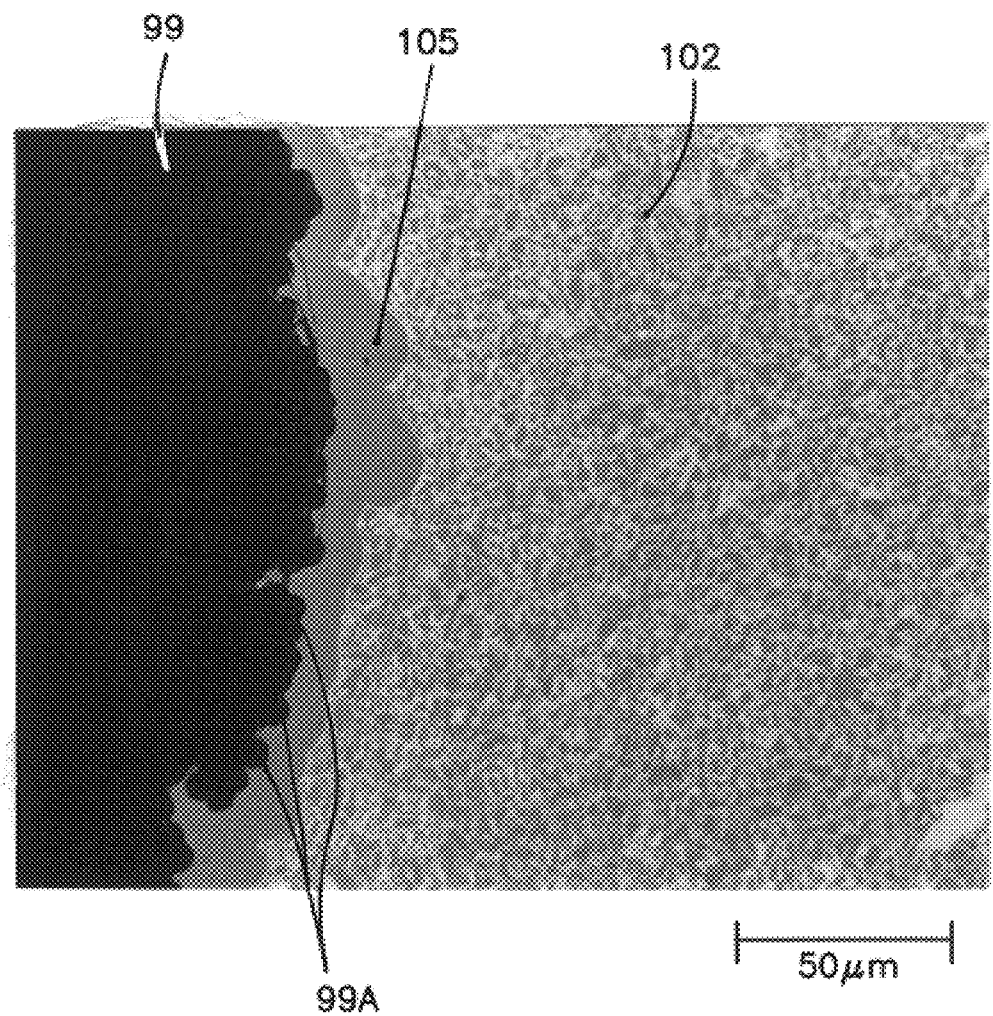
FIG. 1C is a photomicrograph of a portion of the wall of a channel formed within a SiC/SiC ceramic matrix composite made in accordance with the teachings of the present invention.

A cross-section of a portion of the wall of a cooling channel 99 formed by the process of this example is shown in the photomicrograph of FIG. 1C. The inside surface of the channel was determined to be coated with a the thin layer 105 of CVI SiC. This SiC layer should improve the environmental stability and erosion resistance within the channel and of the composite as a whole. In this example the internal surface of the cooling channel 99 has troughs 99A that range in depth from 1 to 7 microns. The troughs replicate the shape, non-uniformities, and surface roughness of individual carbon filaments on the external surface of the pultruded rod prior to decomposition. This suggests the ability to micro-engineer and control critical aspects of cooling channels made by the process of the present invention.

Figure 2:
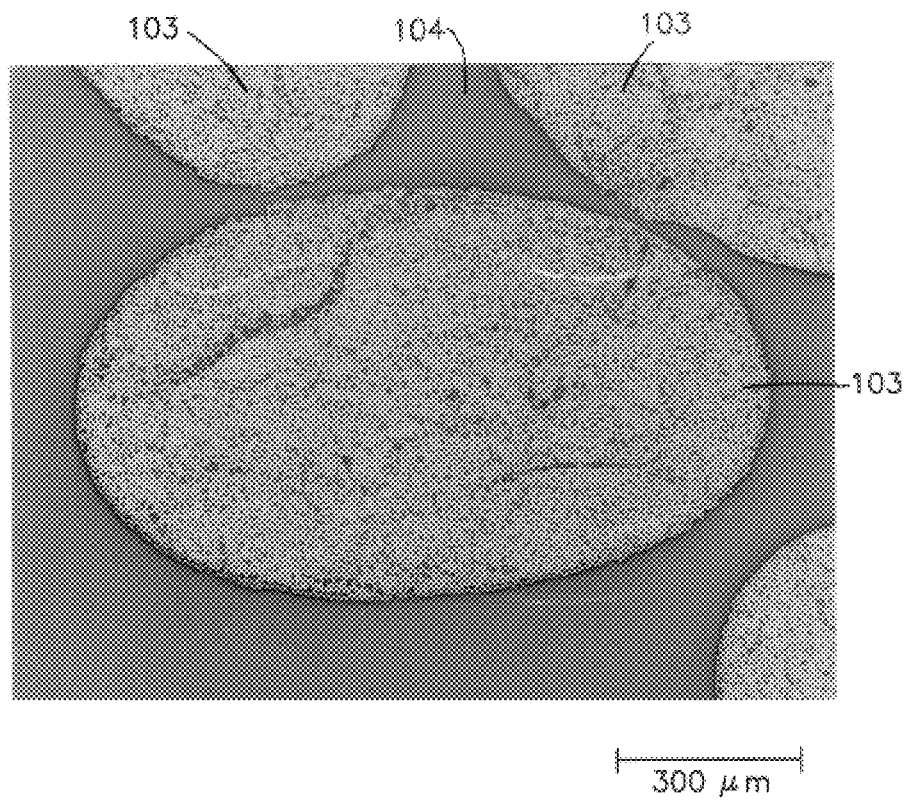
FIG. 2 is a photomicrograph of a cross-section of a carbon fiber, graphite/epoxy filled rod used in the process of the present invention.
Figure 2A:
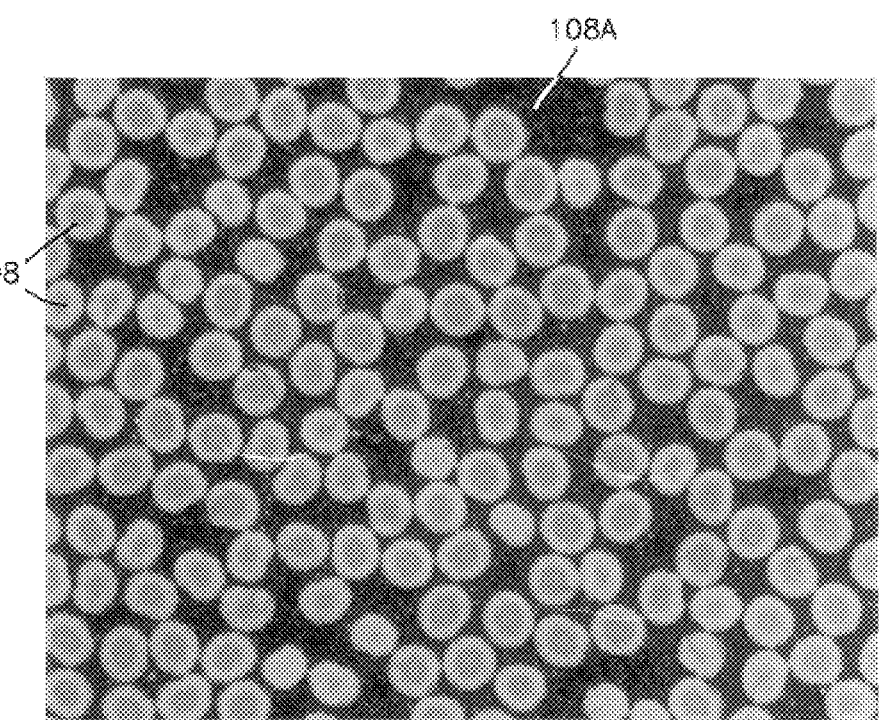
FIG. 2A is a photomicrograph of an enlarged portion of an area of a cross-section through a rod like that of FIG. 2, showing the individual carbon filaments that comprise the rod.

Micro-engineering of the surface may be better understood with reference to FIGS. 2 and 2A. FIG. 2 shows an enlarged cross-section of a pultruded rod prior to insertion into a preform. In this rod the carbon filaments extend axially along the length of the rod with no twist, and the major axis of the oval cross-section is about 0.040 inch. FIG. 2A shows a portion of the cross-section of FIG. 2 greatly magnified such that the individual carbon filaments 108 surrounded by epoxy 108A can be seen. (The individual filaments have a diameter of about 0.25 mil.) Since the troughs replicate the carbon filaments at the surface of the rod (or at the surface of flexible, braided, carbon tows, for example), the surface of the cooling channel can be engineered by changing the size and direction of the carbon filaments 108. If the carbon filament bundle within the rod is twisted, the resultant channel surface will have spiraling troughs. Braided carbon tows would create a crisscross pattern. The advantage of controlling the surface texture of the cooling channel is that it allows engineering of the heat transfer and fluid flow characteristics of the channels. For instance, channel similar to the one shown in FIG. 1C, wherein the individual filaments were substantially straight, was determined to have a friction factor significantly larger than that of a smooth channel. Although, as previously stated, unidirectional, untwisted filaments are preferred for pultruded rods in order to minimize gas infiltration, based upon the foregoing, in some instances it may be more beneficial to create a specific textured surface, such as by twisting or braiding the filaments.

If the panel of FIG. 1 were to be used as the wall of a component subject to extremely high temperatures on one side, holes 109A, 109B (shown using dotted lines in FIGS. 1A and 1B) could be drilled (such as by laser drilling) from the opposite surfaces of the panel to intersect with the channel 99. The channel 99 would be sealed closed at its opposite ends 110. Coolant fluid under pressure on the cooler side of the panel would enter the channel 99 through the drilled holes 109A; travel within the channel; and exit via the drilled holes 109B on the other side.

Although, in this example, straight rods were inserted "in plane" into the preform to form straight cooling channels, other than straight rods may be used to create, for example, curved channels. For example, the rods could have a helical shape and be inserted into the preform like a cork screw. Short helical rods could be inserted perpendicular to the planar surface and, after being thermally decomposed, create helical channels through the thickness of the panel.

EXAMPLE 2

In another test, a flat panel ceramic matrix (silicon carbide) composite woven angle interlock preform was made using the same process and materials as described in the above example, except a weavable, flexible carbon insert was used to create the channel, rather than a graphite/epoxy rod; and the insert was automatically woven into the preform in the warp direction. More specifically, one of the SiC warp fibers was replaced in the weaving loom with a 4000 filament braided carbon tow comprising four individual 1000 filament carbon tows braided together at 22 plaits per inch. The carbon fibers of the tow were made from a polyacrylonitride precursor. The braided tow had an outer diameter of approximately 0.026 inch.

Figure 3:
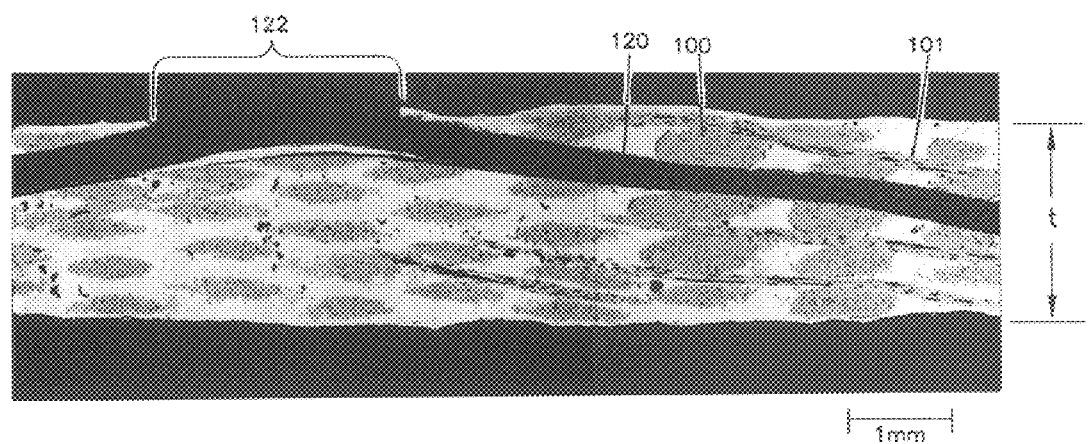
FIG. 3 is a photomicrograph of a section through the thickness of a SiC/SiC ceramic matrix composite panel showing a channel made using a weavable braided carbon tow.

The photomicrograph of FIG. 3 is a section taken through the panel in the warp direction substantially parallel to the warp fibers. The full thickness, t, of the panel is shown and was 0.070 inch. As in the prior example, the SiC warp fibers are designated by the numeral 101, and the SiC fill fibers are designated by the numeral 100. The numeral 120 designates the cooling channel created by thermal decomposition of the braided carbon tow. Note that the channel breaks through the surface 122 of the panel and bends back into the panel, demonstrating the ability of the flexible (weavable) braided carbon insert to change direction without fracturing as it is automatically woven into the preform.

In the test of this Example 2, the braided carbon tow included no carbonaceous filler, and, although it cannot be seen in FIG. 3, some silicon carbide infiltrated the braid and remained within the channels after oxidation, which is undesirable since the channels are small and may become blocked. Had a carbonaceous filler, such as partially cured epoxy, been used, the channels would have been burned out completely, as had been demonstrated in other tests.

FIGS. 4–6 show a SiC/SiC ceramic matrix composite turbine guide vane 200 for use in a gas turbine engine. The vane 200 includes a hollow airfoil 200A defined by a thin wall 201 extending longitudinally between platforms 202A and 202B. The internal cavity of the airfoil is designated by the reference numeral 204. Pressurized cooling air enters the cavity 204 through the radially inner end of the airfoil, below the platform 202B. The radially outer end of the airfoil cavity 204 is closed by an end cap 203. The wall 201 has an external surface 205 and an internal surface 206. The airfoil has a plurality of transversely extending rows (i.e. each row is in a plane which is transverse to the longitudinal direction) of cooling holes 207 through which cooling fluid from within the cavity 204 pass to convectively cool the wall 201 and to provide film cooling to the surface 205.

As best shown in FIGS. 5 and 6, within the wall 201, in the plane of each row of holes 207, is a cooling channel 208 that extends around the perimeter of the airfoil. The cooling holes 207 in each row of holes intersects the cooling channel 208 associated with its respective row. Similarly, transversely extending rows of holes 209 extend from the internal surface 206 of the airfoil and intersect respective cooling channels 208. In operation, pressurized cooling fluid from within the cavity 204 passes into the channels 208 via the holes 209. The fluid travels through the channels 208 and exits through the holes 207.

The airfoil 200A is made in accordance with the teachings of the present invention. Using the well know pin weaving technique, a preform of the appropriate thickness, size and shape is woven using SiC fibers (such as described with respect to Example 1, above) except where cooling channels 208 are to be formed. Where the cooling channels are to be located the SiC fibers of the weaving loom are replaced with braided tows of carbon fibers, such as described with respect to Example 2, except the tows are filled with a thermoset polymer that is only partially cured at the time of weaving. The woven preform is placed over a carbon mandrel in a mold having the desired shape of the airfoil; and the preform is consolidated with SiC matrix material by processes well known in the art.

Although not described, other ceramic matrix composite turbine components may be made using the process of the present invention, such as rotor blades, blade or vane platforms (like the platforms 202A and 202B in FIG. 4), and turbine blade root air seals, to name a few.

Figure 7:
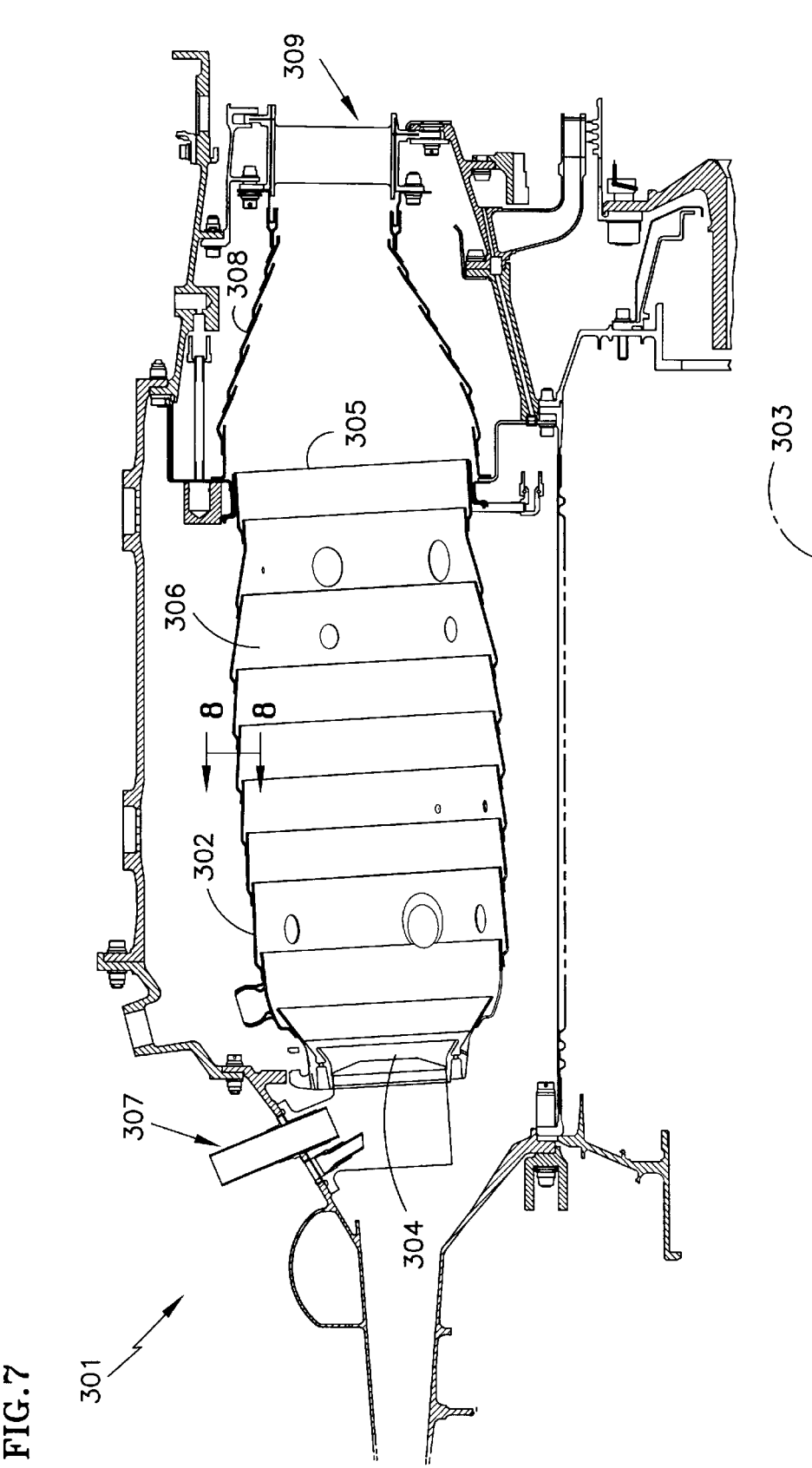
FIG. 7 is an illustrative view, partly in section, of a portion of a gas turbine engine, including the combustion section.

FIG. 7 depicts a portion of a gas turbine engine, including a combustion section 301 having a plurality of generally cylindrical SiC/SiC ceramic matrix composite combustor liners 302 (only one of which is shown) spaced about the engine axis 303. The liners 302 are made in accordance with the process of the present invention, such as by the process of Example 2. Each liner has an inlet 304 and an outlet 305 and defines a combustion space 306 into which fuel is injected via fuel injection apparatus 307. The downstream end of the liner 302 is secured to the upstream end of an annular transition duct 308. The combustion gases leave the combustion space 306, pass through the transition duct 308, and enter the engine turbine section 309.

Figure 8:
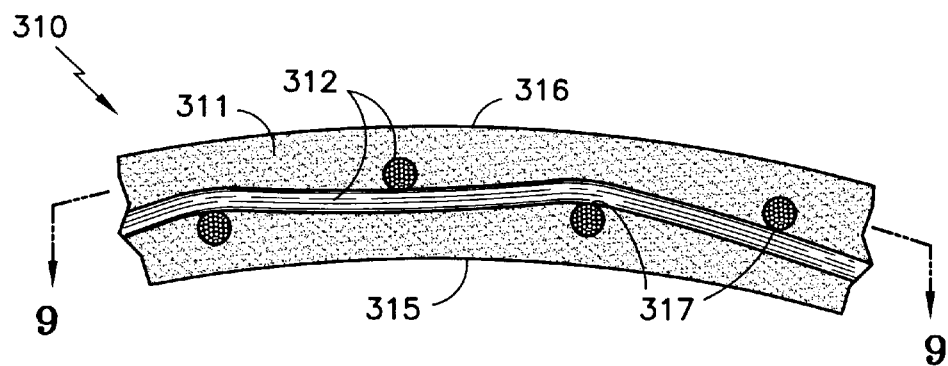
FIG. 8 is a sectional view, greatly enlarged, taken along the line 8—8 of FIG. 7 through the wall of a combustor liner made in accordance with the teachings of the present invention, but illustrating the appearance of that liner at an intermediate point during the fabrication process.
Figure 9:
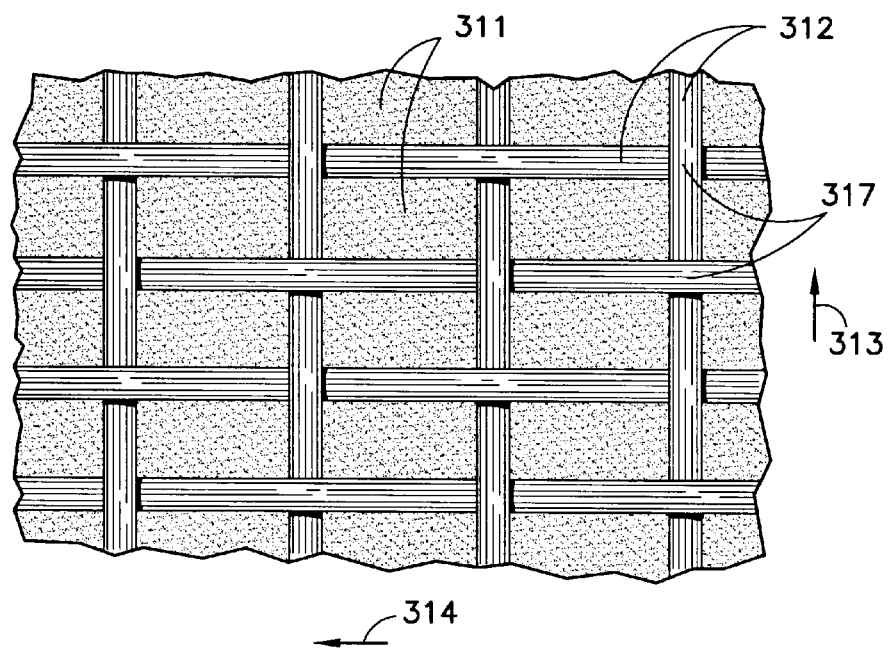
FIG. 9 is a sectional view taken generally along the line 9—9 of FIG. 8.

FIGS. 8 and 9 are enlarged schematic representations of a section of the wall 310 of the liner 302 at an intermediate point in the fabrication process, which is immediately prior to the decomposition step. The stippled portions 311 of FIGS. 8 and 9, represent both the SiC matrix material and the woven SiC fiber tows. The filled carbon fiber tows are designated by the reference numeral 312. For purposes of clearly showing the weave pattern of the carbon fiber tows, the drawing does not show the individual SiC fiber tows that are interwoven with the carbon fiber tows; and, in the cross-section of FIG. 9, the SiC matrix material is treated as if transparent.

In this embodiment, the wall 310 is 0.10 inch thick; and filled carbon fiber tows extend in both the axial direction 313 and the circumferential direction 314, to form a crisscross pattern. The carbon fiber tows are about 0.025 inch in diameter and are equally spaced from both the radially inwardly facing surface 315 and radially outwardly surface 316 of the liner. The tows extending in the fill direction 314 are spaced about 0.10 inch apart; and the tows extending in the warp direction 313 are about 0.10 inch apart. The axial and circumferentially woven carbon fiber tows contact each other at the intersection or crossover points 317.

Figure 10:
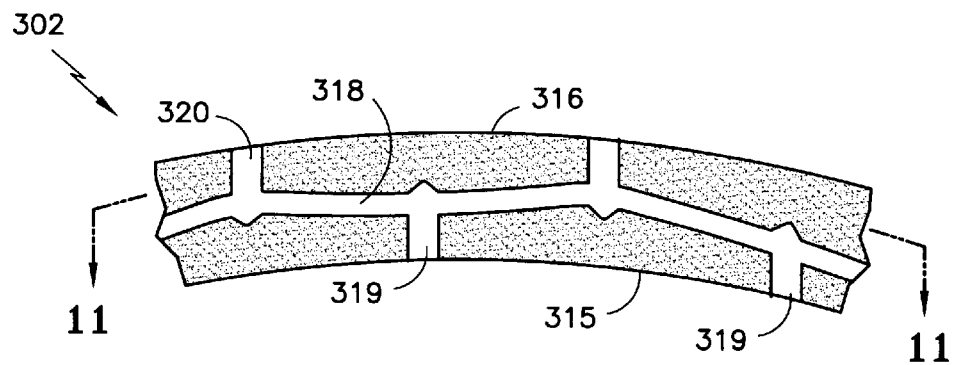
FIG. 10 is a sectional view, greatly enlarged, taken along the line 8—8 of FIG. 7 through the wall of a combustor liner made in accordance with the teachings of the present invention, showing cooling channels within the wall.
Figure 11:
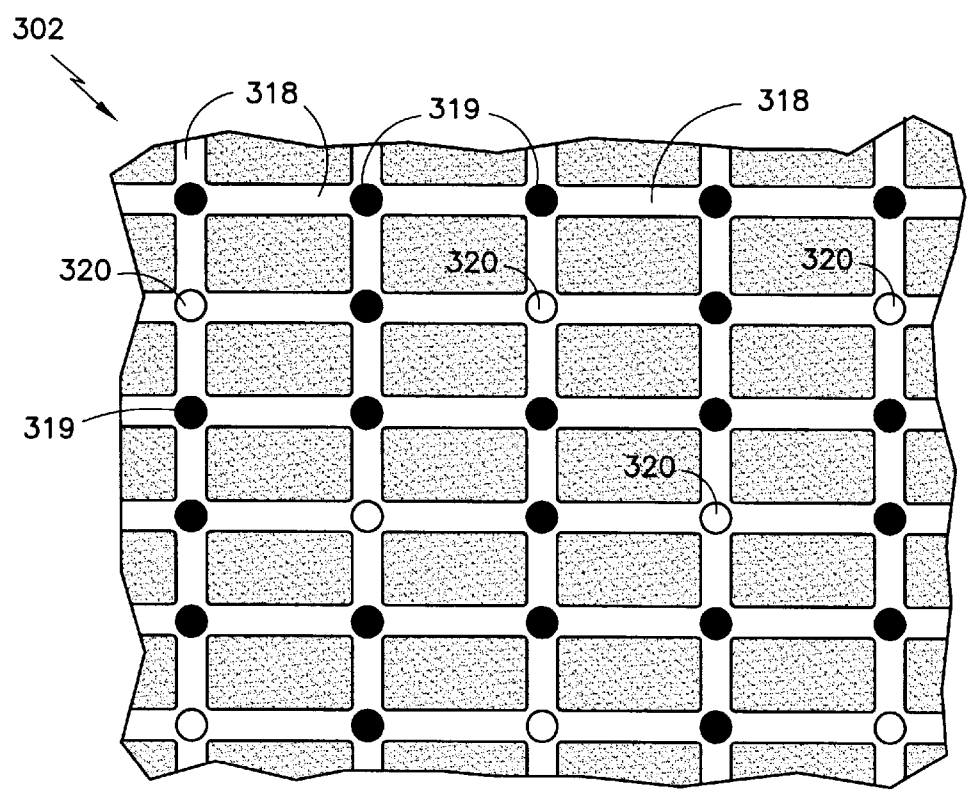
FIG. 11 is a sectional view taken along the line 11—11 of FIG. 10.

FIGS. 10 and 11 show a section of the finished liner 302, after the carbon fiber tows have been removed by thermal decomposition to form a crisscross patterned grid of cooling channels 318. The matrix material and SiC fibers are shown as shaded areas. Also, a plurality of 0.025 inch diameter coolant outlet passageways and inlet passageways 319, 320, respectively, have been laser drilled into the part from, respectively, the surfaces 315, 316. Both sets of passageways intersect with the channel 318 at selected intersections of the crisscross pattern. In FIG. 11 the coolant inlet passageways 320 are depicted as clear circles, and the coolant outlet passageways are depicted as solid circles. In this particular embodiment, none of the inlet passageways are aligned with the outlet passageways, thereby forcing the coolant fluid to traverse at least a portion of the elongated cooling channel. (Note that the dimensions given above for the combustor liner embodiment of FIGS. 7–11 are exemplary only, and do not represent parts that were actually fabricated by the process of the present invention.)

In operation, pressurized cooling air enters the channel 318 via the holes 320. The coolant air travels through various legs of the crisscross pattern of the channel 318 and exits through the outlet holes 319. In the section of liner shown in FIGS. 10 and 11, the number of outlet holes is three times the number of inlet holes. In actuality, the spacing between tows and number of coolant holes and their location is likely to vary over the surface of the liner in order to maintain acceptable temperatures at all locations and to minimize the amount of coolant used. Even the carbon fiber tow weave pattern within the preform may be varied to provide different amounts of cooling to various portions of the liner.

Examples of other ceramic matrix composite combustor components that may be made by the process of the present invention are combustor panels (e. g. panels spaced inwardly from and attached to the combustor liner to create a double wall) and combustor heat shields.

Figure 12:
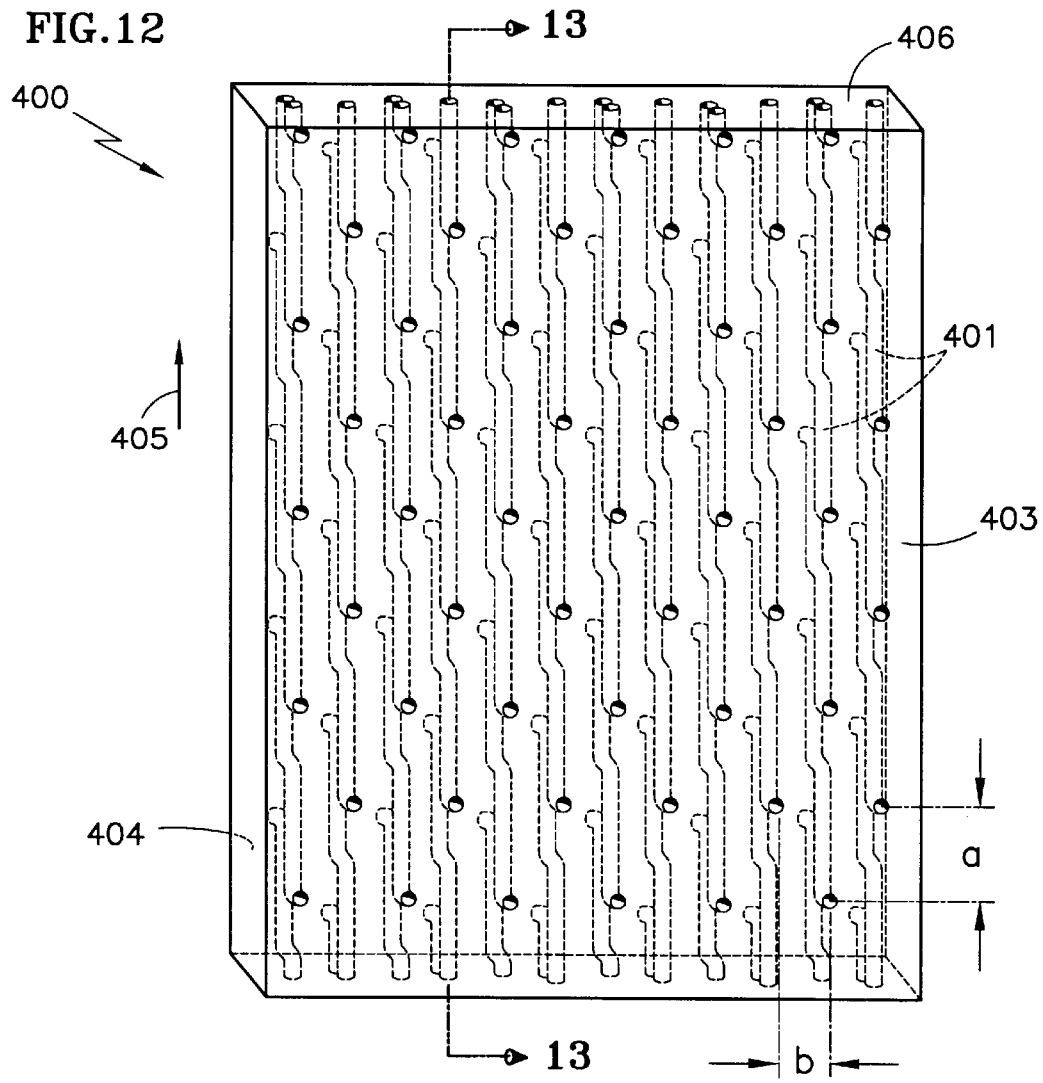
FIG. 12 a perspective view of a wall, illustrating an alternate cooling channel configuration which may be made in accordance with the teachings of the present invention.
Figure 13:
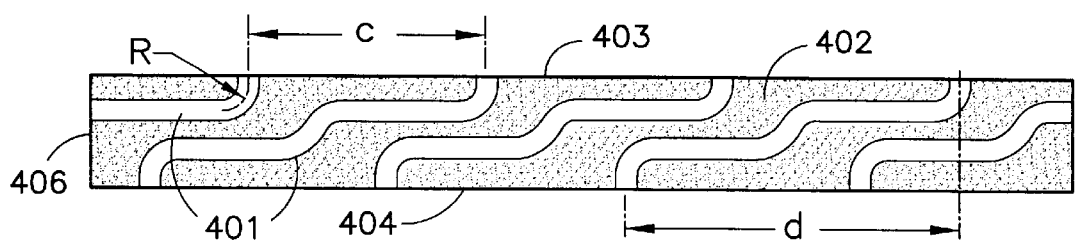
FIG. 13 is a sectional view, rotated 90°, taken along the line 13—13 of FIG. 12.

An example of another cooling channel configuration for a ceramic matrix composite part that may be made according to the present invention is shown in the wall section 400 illustrated in FIGS. 12 and 13. For purposes of clarity, in FIG. 12 the cooling channels 401 are shown in perspective, with the balance of the wall material 402 shown stippled. Each cooling channel 401 extends from one wall surface 403 to the other wall surface 404 through the entire thickness of the wall. In the fabrication of this part the warp direction is designated by the arrow 405. During fabrication, the filled carbon fiber tows are warp "threads", woven together with SiC warp and fill threads to form a preform. The carbon fiber tows, appropriately located within the preform, would each have the final zigzag shape of the cooling channels. The preform is then consolidated with SiC matrix material, and the carbon fiber tows are removed by thermal decomposition, as previously explained.

During operation of the finished part, pressurized cooling fluid on one side of the wall enters the cooling channels and travels in a zigzag path through the wall until it exits on the other side. If desired, some of the cooling fluid may exit from the edge 406 of the wall. One possible set of dimensions for the wall section 400 of this example is a wall thickness of 0.090 inch with the cooling channels having a diameter of 0.020 inch. The distances a, b, c and d would be 0.105 inch, 0.060 inch, 0.21 inch, and 0.30 inch, respectively. The radius of curvature R to the centerline of the channel is on the order of 0.04 inch.

Although the invention has been described and illustrated with respect to exemplary embodiments thereof, it should be understood by those skilled in the art that the foregoing and various other changes, omissions and additions may be made without departing from the spirit and scope of the invention. More specifically, the process is particularly suited for making cooling channels in any thin walled ceramic matrix composite part intended for use at high temperatures.

What is claimed is:

1. A process for manufacturing a ceramic matrix composite part having elongated channels therein, including the steps of:
   A. forming a preform, including the steps of weaving together ceramic fibers and inserting a plurality of elongated carbonaceous inserts within the woven ceramic fibers at the locations where the channels are desired, the inserts comprising carbon fibers surrounded by a carbonaceous filler;
   B. consolidating the preform and a ceramic matrix material to a desired shape; and
   C. removing the elongated inserts after the consolidation step by thermally decomposing the inserts, leaving elongated channels in place of the inserts.

2. The process according to claim 1, wherein the carbon fibers are continuous filaments.

3. The process according to claim 2, wherein the inserts are flexible and are woven into the preform using automated weaving apparatus.

4. The process according to claim 3, wherein the carbonaceous filler includes colloidal graphite.

5. The process according to claim 4, wherein the filler includes a binder for the colloidal graphite.

6. The process according to claim 5, wherein the binder is silicone.

7. The process according to claim 5, wherein the continuous filament carbon fibers are in the form of carbon fiber tows.

8. The process according to claim 3, wherein the carbon fibers are woven to form a crisscross pattern with the fibers contacting each other at crossover points, and the step of removing the inserts creates an interconnected crisscross patterned cooling channel.

9. The process according to claim 8, wherein, after the step of consolidating, (a) forming a first plurality of channels each having a channel outlet in one wall surface of the liner and intersecting the crisscross patterned cooling channel, and (b) forming a second plurality of channels each having a channel outlet in the wall surface of the liner opposite said one wall surface and intersecting the crisscross patterned cooling channel.

10. The process according to claim 3, wherein the continuous filament carbon fibers are in the form of carbon fiber tows.

11. The process according to claim 10, wherein the carbonaceous filler is a thermoplastic polymeric material.

12. The process according to claim 10, wherein the carbonaceous filler is a thermoset polymeric material, and, as the carbon fiber tows are being woven, the polymeric material is only partially cured such that the tows are flexible during weaving.

13. The process according to claim 10 wherein the carbon fiber tows are braided together.

14. The process according to claim 10 wherein the continuous filaments comprising the carbon tows are twisted together.

15. The process according to claim 3, wherein the step of consolidating forms a thin walled part having spaced apart first and second wall surfaces, and at least some of said flexible inserts that are woven into the preform extend in a zigzag pattern from said first to said second surface, wherein the step of thermal decomposition of the inserts forms zigzag channels through the thickness of the part where the inserts were located.

16. The process according to claim 15, wherein the carbon fiber continuous filaments of the flexible inserts woven into the preform are in the form of carbon fiber tows.

17. The process according to claim 3, wherein at least some of the elongated channels formed by the thermally decomposed inserts have an effective diameter of no greater than 0.05 inch, and include at least one change of direction with a radius of curvature less than 1.0 inch.

18. The process according to claim 3, wherein step B includes consolidating the preform to form a thin walled airfoil shaped portion surrounding an internal cavity, and in step A the flexible inserts are woven into the preform such that, when removed by thermal decomposition, the elongated channels of step C are formed within the wall of the airfoil shaped portion, and at least some of said channels extend around the perimeter of the airfoil shaped portion.

19. The process according to claim 18, wherein the thin walled airfoil shaped portion has opposing surfaces, and the process includes the step of drilling a plurality of cooling passages from as least one of said opposing surfaces into at least one of said channels that extend around the perimeter of the airfoil shaped portion.

20. The process according to claim 2 wherein the ceramic fibers are silicon carbide fibers.

21. The process according to claim 2, wherein the part has a thin wall of ceramic matrix composite material having opposing surfaces, and the elongated channels are formed within the thin wall, including the step of drilling at least one cooling passage from at least one of said opposing surfaces into the elongated channel.

22. The process according to claim 2, wherein the inserts are rods of continuous carbon fibers within a cured, thermoset polymeric carbonaceous filler material.

23. The process according to claim 22, wherein the polymeric material is epoxy.

24. The process according to claim 23, wherein the rods are pultruded rods.

25. The process according to claim 22, wherein the volume percent of fibers in the rod is between 50 and 65%.

26. The process according to claim 25, wherein the rods are helical.

27. The process according to claim 22, wherein the rods are helical.

* * * * *